(12) United States Patent
Lau

(10) Patent No.: US 10,862,412 B2
(45) Date of Patent: Dec. 8, 2020

(54) MULTI-PHASE BRUSHLESS DIRECT-CURRENT MOTOR AND DRIVE METHOD THEREFOR

(71) Applicant: POLYCHARM DEVELOPMENT LIMITED, Hong Kong (HK)

(72) Inventor: Chun To Lau, Hong Kong (HK)

(73) Assignee: POLYCHARM DEVELOPMENT LIMITED, Hong Kong (HK)

( * ) Notice: Subject to any disclaimer, the term of this patent is extended or adjusted under 35 U.S.C. 154(b) by 0 days.

(21) Appl. No.: 16/417,652

(22) Filed: May 21, 2019

(65) Prior Publication Data

US 2019/0273455 A1    Sep. 5, 2019

Related U.S. Application Data

(63) Continuation-in-part of application No. 15/780,258, filed as application No. PCT/CN2016/073044 on Feb. 1, 2016, now Pat. No. 10,298,160.

(30) Foreign Application Priority Data

Dec. 2, 2015  (CN) .......................... 2015 1 0872243

(51) Int. Cl.
| | |
|---|---|
| *H02P 6/28* | (2016.01) |
| *H02M 7/5387* | (2007.01) |
| *H02P 25/22* | (2006.01) |
| *H02M 1/12* | (2006.01) |
| *H02M 7/5395* | (2006.01) |
| *H02M 1/00* | (2006.01) |

(52) U.S. Cl.
CPC ................. *H02P 6/28* (2016.02); *H02M 1/12* (2013.01); *H02M 7/5395* (2013.01); *H02M 7/53871* (2013.01); *H02M 7/53873* (2013.01); *H02P 25/22* (2013.01); *H02M 2001/0009* (2013.01); *H02M 2001/0054* (2013.01); *H02M 2001/0077* (2013.01)

(58) Field of Classification Search
None
See application file for complete search history.

(56) References Cited

U.S. PATENT DOCUMENTS

| | | |
|---|---|---|
| 2006/0164028 A1 | 7/2006 | Welchko et al. |
| 2012/0217920 A1 | 8/2012 | Singh et al. |
| 2019/0273455 A1* | 9/2019 | Lau .................. H02M 7/53871 |

OTHER PUBLICATIONS

European Search Report for European Patent Application No. 16869488.3 dated Jun. 28, 2019.

* cited by examiner

*Primary Examiner* — Bentsu Ro

(57) ABSTRACT

A BLDC motor comprising a permanent magnet motor rotor defining a motor axis, a motor housing and a plurality of phase winding circuits mounted on the motor housing to form a stator, wherein each phase winding circuit comprises a phase winding and a driving bridge which is to operate to drive a phase current to flow through the phase winding, and the driving bridge comprises a switching circuit to provide a switched power supply to energize the phase winding; and wherein the phase windings are disposed at different angular positions with respect to the motor axis or the motor housing.

19 Claims, 11 Drawing Sheets

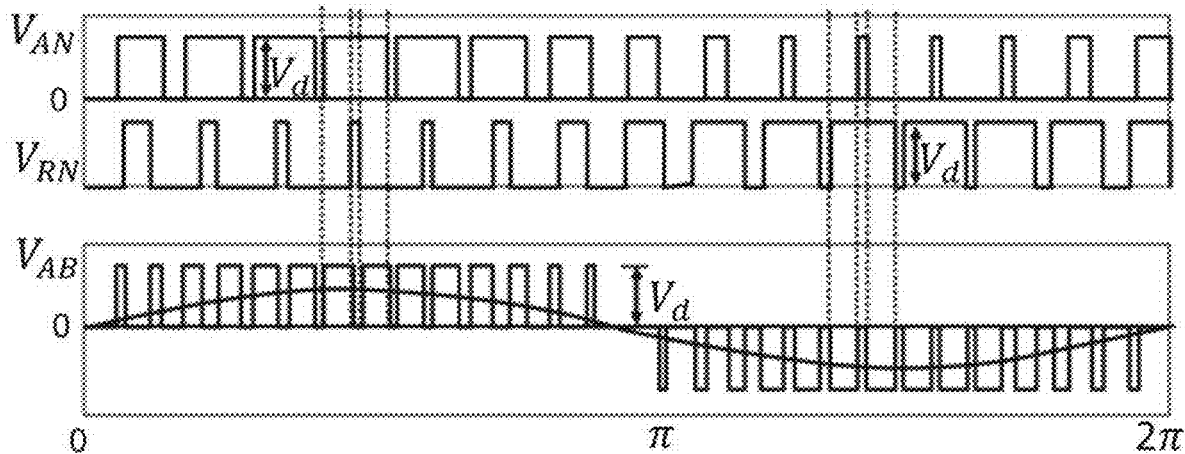
Fig. 4
| g1 | g2 | g3 | g4 | A | B | $V_{AB}$ |
|----|----|----|----|---|---|----------|
| high | high | low | low | high | low | positive |
| low | low | high | high | low | high | negative |
Fig. 5
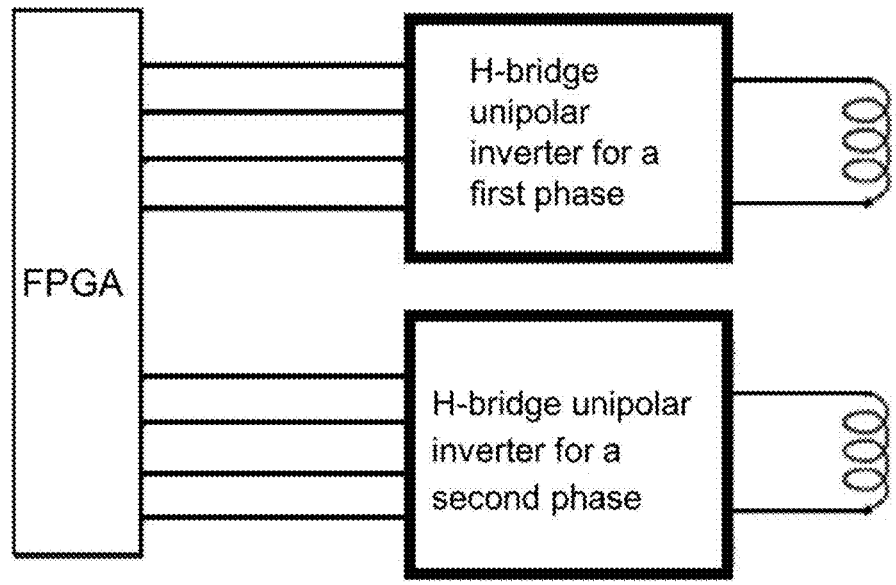
Fig. 6

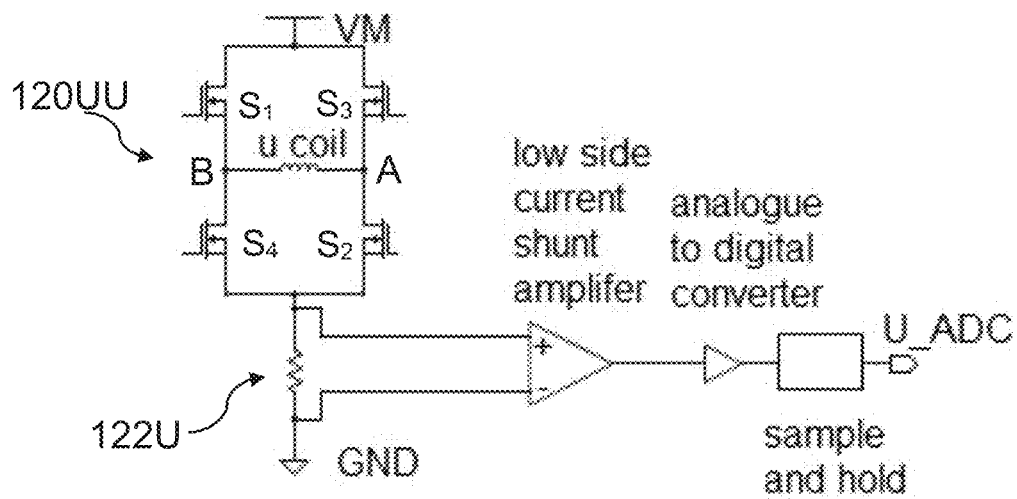
Fig. 8A1
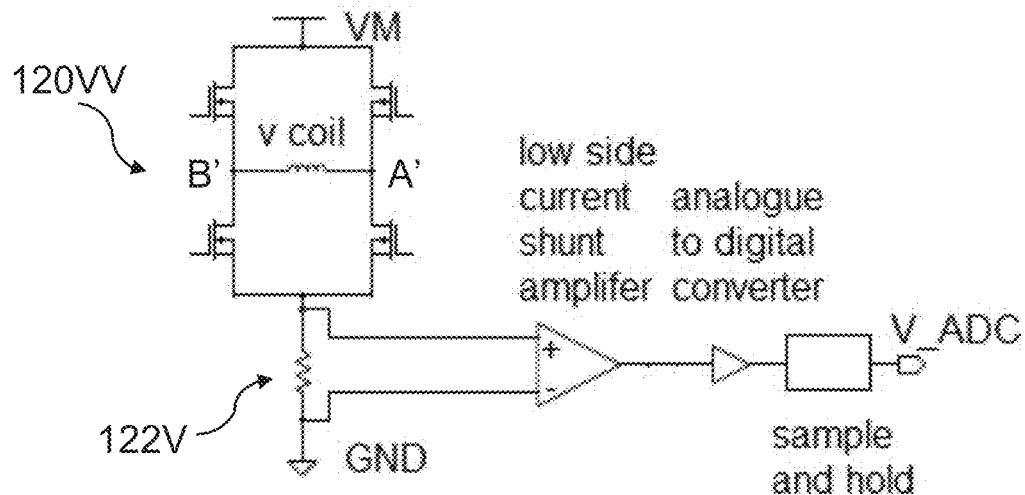
Fig. 8A2
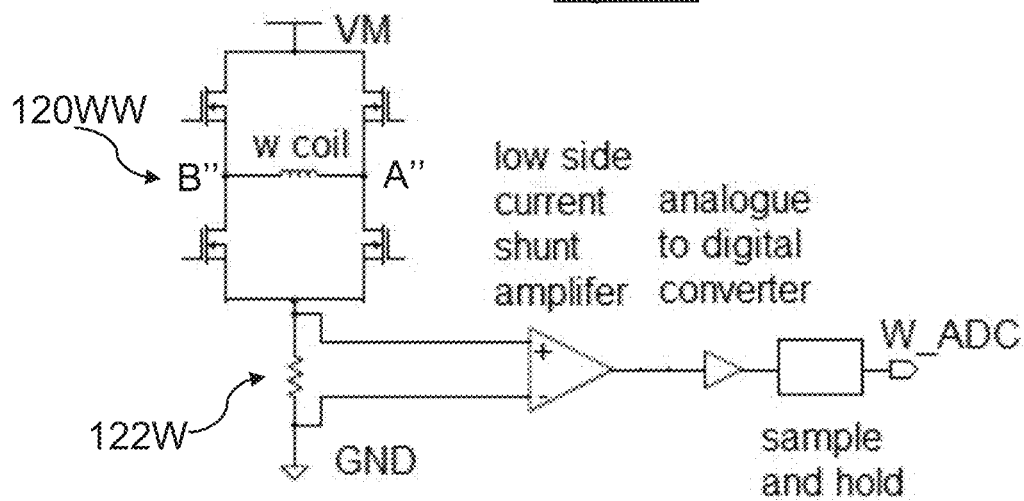
Fig. 8A3

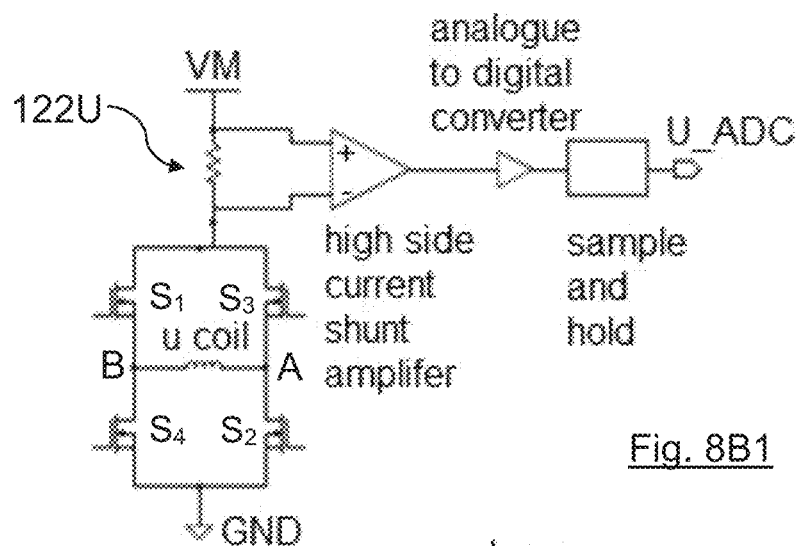
Fig. 8B1
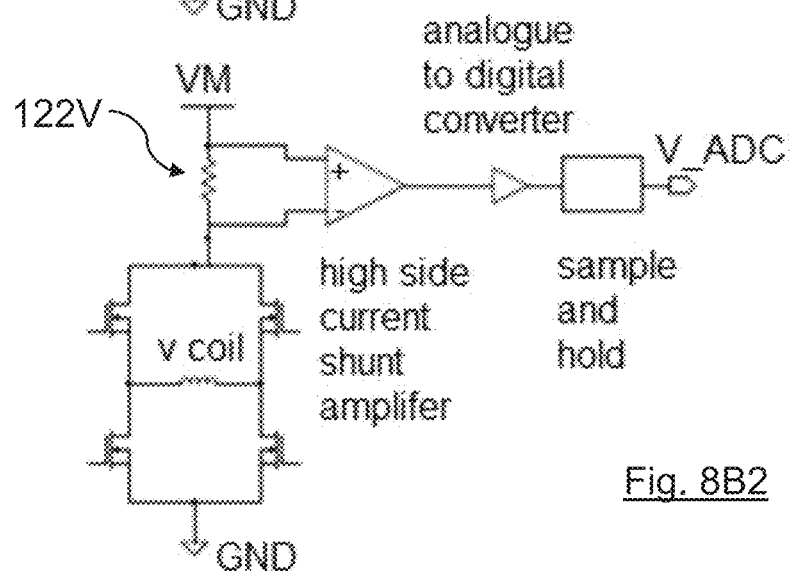
Fig. 8B2
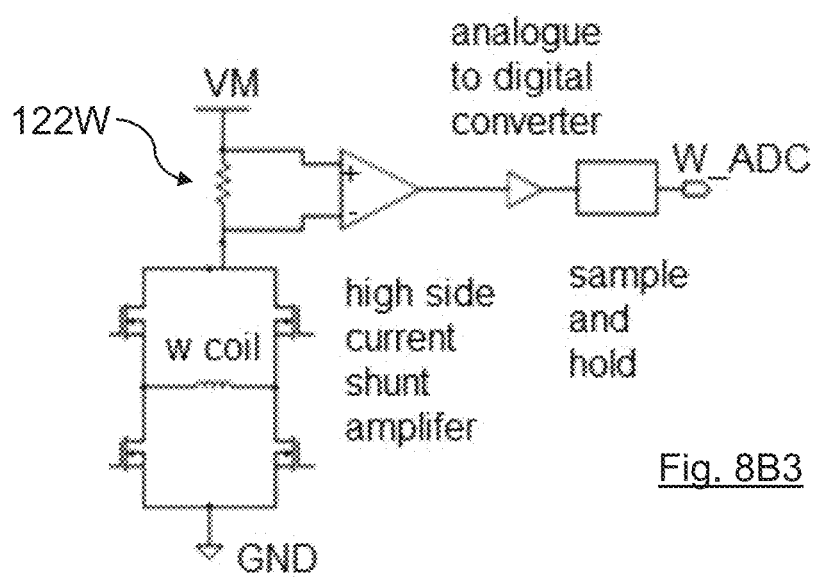
Fig. 8B3

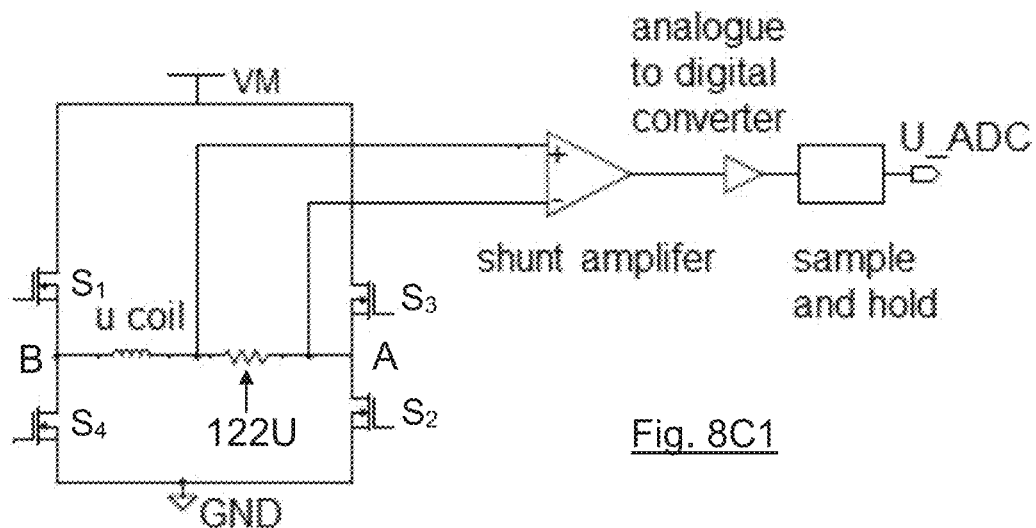
Fig. 8C1
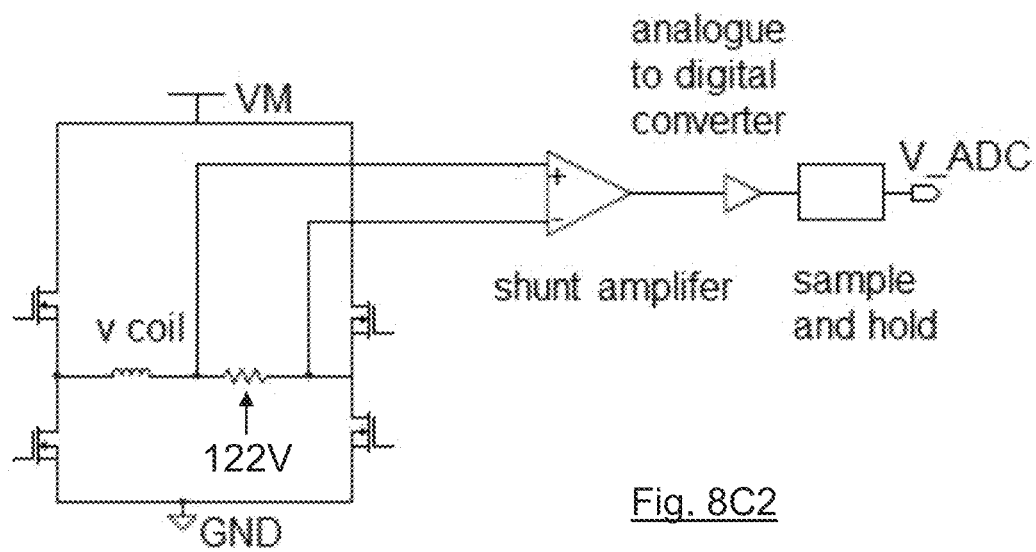
Fig. 8C2
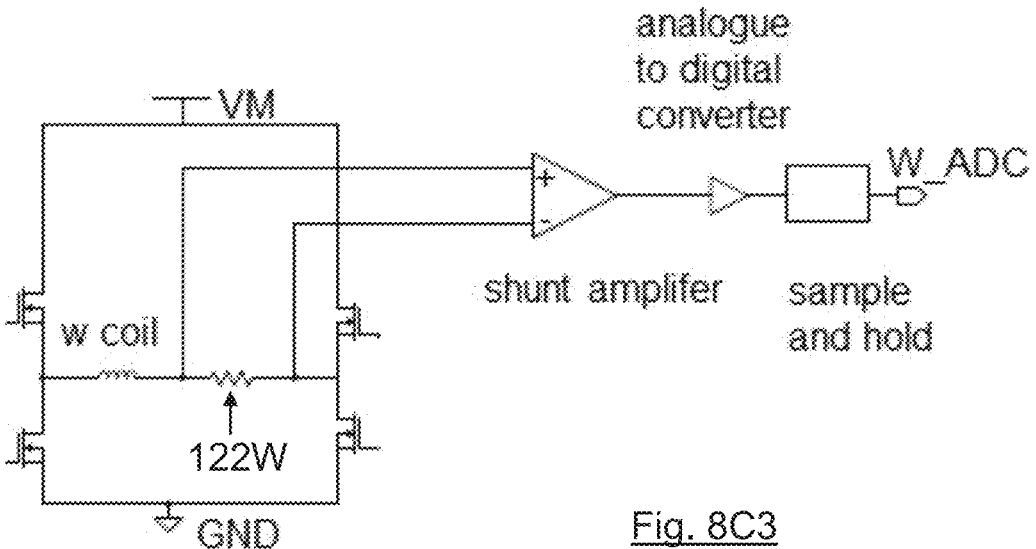
Fig. 8C3

MULTI-PHASE BRUSHLESS DIRECT-CURRENT MOTOR AND DRIVE METHOD THEREFOR

CROSS REFERENCE TO RELATED APPLICATIONS

This application is a continuation-in-part application of United States patent application number U.S. Ser. No. 15/780,258, which was filed on May 31, 2018 as a US national phase entry of international patent application PCT/CN2016/073044, which was filed on Feb. 1, 2016 and claimed priority from a patent application number 201510872243.9 of China, which was filed on Dec. 2, 2015.

FIELD

The present invention relates to brushless direct current (DC) motors and more particularly to multi-phase brushless DC (BLDC) motors and drive methods therefor.

BACKGROUND

Compared with other motors, a brushless DC motor exhibits advantages of energy saving and high reliability and has become increasingly popularized. Single-phase DC driving is achieved by a single H-bridge inverter with a Hall-effect sensor. In addition, a conventional three-phase DC motor, with or without a sensor, is typically driven by three half-bridges, and has phase coil windings that are typically configured in a star shape. As shown in FIG. 1, three phase coil windings 1 have a common terminal. Trapezoidal or sinusoidal magnetic field orientation control is the most common commutation method. However, in such a case, a voltage or current output by the inverter has a shape only similar to sine, and a brushless DC motor driven by such a voltage or current may cause large power consumption and audible noises.

SUMMARY

A BLDC motor comprising a permanent magnet motor rotor defining a motor axis, a motor housing and a plurality of phase winding circuits mounted on the motor housing to form a stator is disclosed. The plurality of phase winding circuits forms a multiphase BLDC motor having a corresponding plurality of phases. Each phase winding circuit is an independent phase winding circuit comprising a phase winding and a corresponding driving bridge for driving the phase winding. The phase winding circuit is an independent phase winding circuit such that the driving bridge of a phase winding is to drive a phase current through the phase winding of that phase winding circuit and not through a phase winding of another phase winding circuit. The phase winding circuit is an independent phase winding circuit such that a phase current which is to flow through a phase winding will only flow through that phase winding, and does not flow through a phase winding or another, different, phase. The independent phase winding circuits mean that no phase current is to flow between or among phase windings of different phases.

The driving bridge comprises a switching circuit to provide a switched power supply to energize the phase winding. The phase windings are disposed at different angular positions with respect to the motor axis or the motor housing. Each phase winding circuit comprises a closed loop inside which the phase current of the phase winding of that phase winding circuit and no other phase winding circuit is to flow.

The disclosure disclosed methods of driving BLDC motors as well as methods for determining phase currents of a multiphase BLDC motor. The phase currents may be used to determine rotor position, for example, using FOC control methodologies or for other control purposes.

The methods for determining phase currents comprise a controller determining the phase current flowing in a first winding phase with reference to digital data of phase currents flowing in a second phase winding and a third phase winding of the motor winding. The reference to phase currents flowing in other phase windings facilitates useful mitigation of errors due to temperature drift of ADC and reference voltage differentials among component circuits of a motor control module. A motor control module herein comprises a controller, ADC, driving bridges and other driving circuits, as well as other peripheral circuits including data processing circuits and peripheries.

The present invention discloses a multi-phase brushless DC motor comprising a motor body and a driving module thereof, the drive module comprising a plurality of phase coil windings, wherein the driving module further comprises:

a controller, having a plurality of output terminals; wherein the output terminals are arranged to control respective control legs of each of a plurality of H-bridge unipolar inverters which is electrically connected to a respective phase of the multi-phase for the motor, with an output signal of the controller being pulse width-modulated sine waves, and the pulse width-modulated sine waves being adapted to drive respective ones of the plurality of H-bridge unipolar inverters; wherein the pulse width-modulated sine waves are of identical frequency and amplitude;

wherein each of the H-bridge unipolar inverters further comprises two output ends adapted to electrically connect with two ends of a respective one of the plurality of phase coil windings; and wherein each respective one of the plurality of phase coil windings is an independent one to another; with the pulse width-modulated sine waves corresponding to every two adjacent phase coil windings having a non-zero phase difference, and phase differences of the plurality of phase coil windings are identical.

According to the multi-phase brushless DC motor provided by the present invention, the phase is also called an included angle, and the phase difference is also called included angle difference.

According to the multi-phase brushless DC motor provided by the present invention, the plurality of phase coil windings comprise two phase coil windings, three phase coil windings, or phase coil windings in a number being a multiple of two or three.

According to the multi-phase brushless DC motor provided by the present invention, the controller is a Field-Programmable Gate Array (FPGA) or other electronic elements with a Programmable Gate Array. The pulse width-modulated sine waves are provided by a Coordinate Rotation Digital Computer (CORDIC) algorithm and a multiplier.

According to the multi-phase brushless DC motor provided by the present invention, the controller is an analog or digital circuit unit. The pulse width-modulated sine waves are provided by a hardware circuit.

The present invention solves a further technical problem mentioned above by constructing a drive method for a multi-phase brushless DC motor, wherein a controller and a plurality of H-bridge unipolar inverters each of which representing each phase of the multi-phase for the motor and having output ends adapted to electrically connect with two ends of a respective one of a plurality of phase coil windings are used, the drive method comprising the steps of:

501) outputting pulse width-modulated sine waves with identical frequency and amplitude from the controller thereby driving respective ones of the plurality of H-bridge unipolar inverters for each phase; wherein the pulse width-modulated sine waves correspond to every two adjacent phase coil windings having a non-zero phase difference, and phase differences of the plurality of phase coil windings are identical; and 502) outputting sine wave driving voltages or sine wave driving currents in their corresponding phases from the respective ones of the plurality of H-bridge unipolar inverters to the corresponding, electrically connected phase coil windings.

According to the drive method for a multi-phase brushless DC motor provided by the present invention, each of the plurality of H-bridge unipolar inverters is preferably adapted to operate in a unipolar mode.

According to the drive method for a multi-phase brushless DC motor provided by the present invention, the plurality of phase coil windings comprise two phase coil windings, three phase coil windings, or phase coil windings in a number being a multiple of two or three.

The multi-phase brushless DC motor and drive method therefor provided by the present invention avoid the conventional star-type configuration for the coil windings and have the following advantages over existing solutions.

1. An H-bridge unipolar inverter is used for each winding;
2. A plurality of phase coil windings are each independent from one to another without a common connection point and consequently cause no influence to one another; and
3. The algorithm is simple and enables all the windings to be driven by smooth pure sine waves.

BRIEF DESCRIPTION OF FIGURES

FIG. 4 is a schematic timing view of pulse width-modulated sine waves output from the H-bridge unipolar inverters in FIG. 3;

FIG. 5 is a schematic view of a truth table for control signals in relation to output voltages of the H-bridge unipolar inverters in FIG. 3; and FIG. 6 is a schematic view of a circuit structure of a two-phase brushless DC motor according to a preferred embodiment of the present invention.

DETAILED DESCRIPTION

Figure 1:
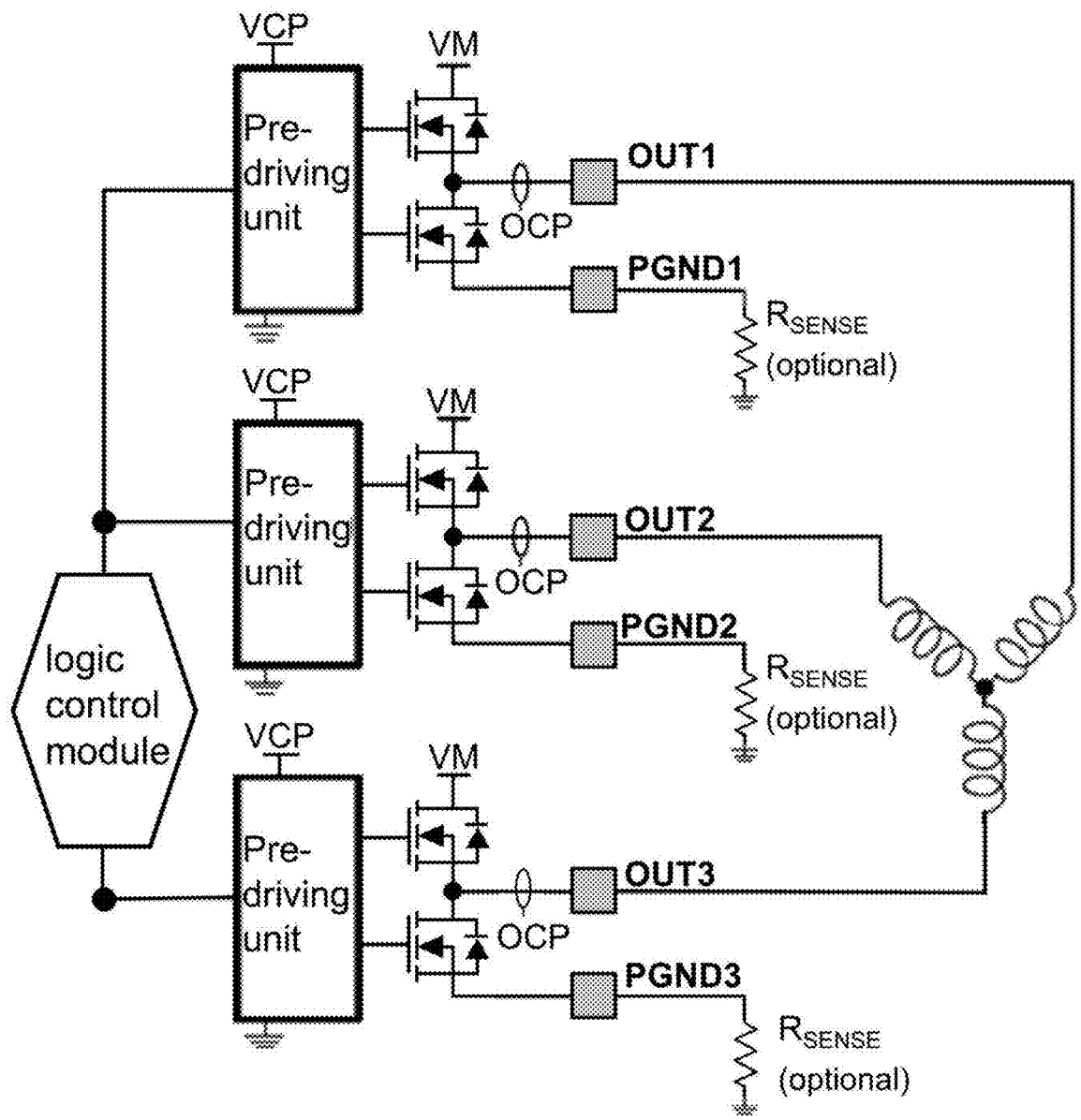
FIG. 1 is a schematic view of a circuit structure of a conventional three-phase brushless DC motor.
Figure 2:
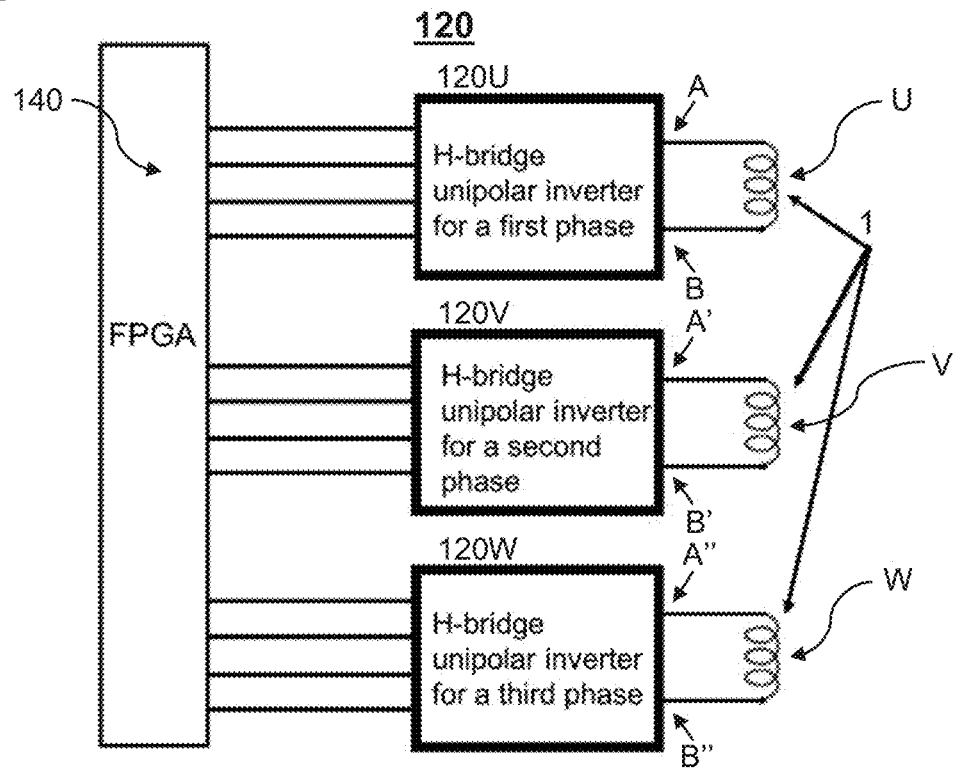
FIG. 2 is a schematic view of a circuit structure of a three-phase brushless DC motor according to a preferred embodiment of the present invention.

A three-phase brushless DC motor according to a preferred embodiment of the present invention is provided with a structure shown in FIG. 2, in which a three-phase brushless DC motor is driven by three H-bridge unipolar inverters and is provided with three independent phase coil windings 1 without a common connection point. In this way, all the windings can be driven by smooth pure sine waves, so that the phase coil windings 1 of the motor have a minimum power harmonic, thereby achieving a maximum driving efficiency. In addition, in this motor, a powerful high-speed FPGA is used to drive all the three H-bridge unipolar inverters simultaneously.

Figure 3:
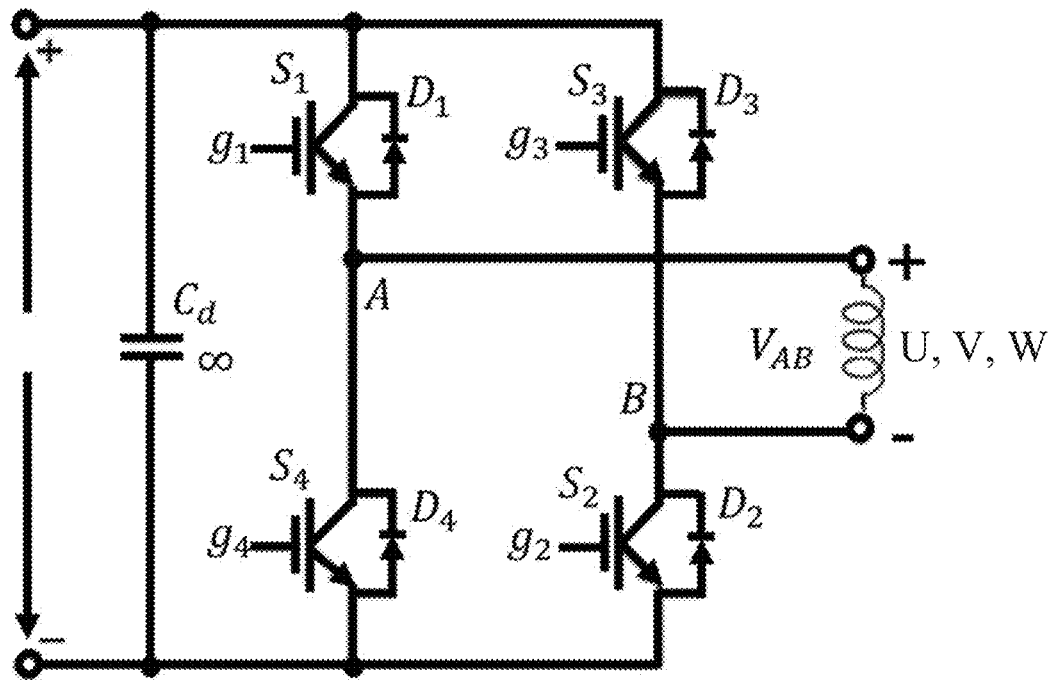
FIG. 3 is a schematic view of a circuit structure of each of the H-bridge unipolar inverters in FIG. 1.

The H-bridge unipolar inverters according to the preferred embodiment of the present invention each has a structure shown in FIG. 3, and is driven via four gates g1, g2, g3, and g4 and output a motor driving signal $V_{AB}$. In order to achieve an optimum switching efficiency, all the inverters are driven by a gate signal and operate in a unipolar mode, as shown in FIG. 4, in which $V_{AN}$ is a voltage of A with respect to a hypothetical functional earth N and $V_{BN}$ is a voltage of B with respect to the hypothetical functional earth N.

The three-phase brushless DC motor according to the preferred embodiment of the present invention is operated as follows.

The inverters driven via the gates are each driven by a group of four digital pins corresponding to the FPGA. In order to provide entirely smooth pure sine waves as signals for driving the windings, a sine pulse width modulation method is employed in such a manner that a PWM signal of a constant amplitude and a varying duty ratio of pulse width is transferred to each group of the H-bridge inverters in each period. The sine wave PWM signal of a varying duty ratio flows through each of the windings, so that the voltage on the windings has a wave form similar to that of an AC signal. Also, to achieve an optimum switching efficiency, all the inverters are driven by a gate signal and operate in a unipolar mode. The powerful high-speed FPGA in the three-phase brushless DC motor has an embedded CORDIC sine algorithm which uses 32 data bits to define an angle within a range of 0 to 360 degrees. The sine value of the angle (from +1.0 to −1.0) is represented by 24-bit data and is accurate to 2 seconds. The symbol of the data defines a direction of the current flowing through the windings. A 24×24 bit multiplier is used to multiply the 24-bit data of the sine value of the angle with the switching frequency to yield the duty ratio of the PWM signal. A constant value and an accumulated angle value are added at a fixed time interval, such that a constant unipolar modulated sine wave is generated. Changes to this constant value or time interval will lead to change in the frequency of the sine wave.

In this embodiment, to drive the three-phase DC motor, ⅓ of a 32-bit full-scale value and an angle value are added to yield sine wave data for a phase current of a second phase winding that is 120 degrees behind a first phase winding. Likewise, ⅔ of a 32-bit full-scale value and an angle value are added to yield sine wave data for a phase current of a third phase winding that is 240 degrees behind the first phase winding. In this order, the current flows into each of the phase windings sequentially so as to drive the motor to rotate, thereby achieving perfect synchronization.

FIG. 5 shows the truth relationship between the control signals output to the H-bridge inverters from the FPGA and the phase voltages output to the motor from the inverter bridges.

For any type of multi-phase motor, it can be driven by using the same method, as long as the angles between its phases are identical. For example, it may be a two-phase brushless DC motor with a phase angle of 90 degrees that has a circuit structure shown in FIG. 6. The FPGA control algorithm for a two-phase DC motor is similar to that of a three-phase DC motor, and the truth relationship between the control signals output to the H-bridge inverters from the FPGA and the phase voltages output to the motor from the inverter bridges in a two-phase DC motor is the same as that of a three-phase DC motor, and therefore the description thereof will not be made again.

An electric motor (or motor in short) comprises one motor winding or a plurality of motor windings. Each motor winding typically comprises a plurality of coils and the coils may be connected in series and/or parallel to form a motor winding. Each coil is typically wound about a magnetic core in a definite shape to form a coil plane such that when a drive current passes through the coil, a magnetic flux in a direction orthogonal to the coil plane will be generated as a motor driving flux. The coil planes of the coils which cooperate to form a motor winding are typically coplanar and/or parallel to each other to provide a motor driving flux sufficient to meet driving torque and/or power requirements. A coil herein is a motor coil and is typically formed of a thinly insulated conductor, which is commonly known as lacquered wire or magnet wire. A magnet wire is typically a copper wire applied with a thin insulating coating, such as an enamel coating.

A motor comprises a stator and a rotor. A rotor is to rotate relative to the stator during motor operations. An electric motor may be single phase motor or a multiple-phase motor (or multiphase motor in short). A single-phase motor typically has a single motor winding which is distributed on two diametrically opposite sides of a motor shaft. The motor shaft defines a rotational center and a center axis of the motor. The center axis of the motor extends along the rotational center and along a longitudinal direction to define an axial direction of the motor. The center axis of the motor is also a longitudinal axis of the motor and is also referred to as a motor axis. A multiple-phase motor comprises a plurality of motor windings. A multiple-phase motor is designed to be driven by a multiphase power supply. A multiphase power supply has a plurality of power outputs, and the plurality of power outputs is at a corresponding plurality of output phases. Each output phase of the multiphase power supply has an assigned phase and the output phases of the multiphase power supply are at different phases. Each phase winding of a multiple-phase motor is for connection to a corresponding output phase of a multiphase power supply for normal motor operations. The phase currents which are to flow in the different phase windings of a multiple-phase motor are at different phases, and usually follow the phases of the corresponding supply phases. The motor windings of a multiphase motor are distributed at angular intervals with respect to the motor axis. For smooth drive performances, the motor windings are typically distributed at equal angular intervals about the motor shaft. Each motor winding of a multiphase motor is also referred to as a phase winding. The motor shaft may be part of the rotor or part of the stator without loss of generality. Each motor winding has an axial extent and a transversal extent orthogonal to the axial extent. The axial extent defines the axial length of the winding and the transversal extent defines the angular extent of the winding with respect to the motor axis. The rotor of a BLDC motor is usually a permanent magnet rotor so that there is no brushed commutation required.

A magnetic flux (phase flux) for driving the motor shaft into rotation is produced when a phase current flows through a phase winding. Each phase winding has a characteristic magnetic flux axis (or magnetic axis in short) which is the axis of the phase flux. The characteristic magnetic axis of a phase winding is usually radially oriented with respect to the motor axis, for example, extends in a direction at an angle such as orthogonal to and intercepting the motor axis. The magnetic axis is usually a center axis on the center plane of a phase winding. The angular position of a phase winding is typically characterized by the angular position of the magnetic axis of the phase winding with respect to the motor housing on which the phase windings are mounted or installed or with respect to the motor axis, and the angular separation between adjacent phase windings is characterized by the angular separation of the magnetic axes of the adjacent phase windings. For example, a typical three-phase motor has the magnetic axes of the phase windings separated by an example angular interval of $2\pi/3$ (or 120 degrees) with respect to the motor axis, a typical four-phase motor has the magnetic axes of the phase windings separated by an example angular interval of $\pi/4$ (or 90 degrees) with respect to the motor axis, a typical five-phase motor has the magnetic axes of the phase windings separated by an example angular interval of $2\pi/5$ (or 72 degrees) with respect to the motor axis, a typical six-phase motor has the magnetic axes of the phase windings separated by an example angular interval of $\pi/3$ (or 60 degrees) with respect to the motor axis, and so forth. The angular separation between magnetic axes of adjacent phase windings is usually related to the number of phase windings, n, of the motor by the relationship $2\pi/n$ or $360°/n$, where n is the number of phases of the motor.

The phase windings are physically distributed with respect to the motor shaft or the motor axis. Usually, the phase windings are physically distributed at uniform angular intervals. In example embodiments, the phase windings are physically distributed on the motor housing. For example, a typical three-phase motor has its phase windings distributed at 120-degree intervals with respect to the motor axis, a typical four-phase motor has its phase windings distributed at 90-degree intervals with respect to the motor axis, a typical five-phase motor has its phase windings distributed at 72-degree intervals with respect to the motor axis, a typical six-phase motor has its phase windings distributed at 60-degree intervals with respect to the motor axis, and so forth. A typical multiphase motor usually has three phases, although multiphase motors having two or more than three phase windings are not uncommon. The angular interval between adjacent phase windings herein is a nominal interval which is defined between the center axes of an adjacent pair of phase windings. The center axis of a phase winding is on the center plane of a phase winding which extends in a radial direction and orthogonally intercepts the motor axis. Since a phase winding usually has an angular spread in the circumferential direction, the actual physical separation between an adjacent pair of phase windings is usually less than the nominal angular separation, which are measured with respect to magnetic axes.

Each phase winding of a motor is connected to an electric power source (power source in short). The power source is to supply an electric current (current in short) which when flowing through the phase winding is to produce magnetic flux. When magnetic flux on the motor stator interacts with magnetic flux on the motor rotor, the motor rotor will rotate about the motor axis and deliver a rotational driving power, which is a mechanical power. In order for the magnetic fluxes to interact to general a driving power, the magnetic fluxes are typically at a relative angle to each other, for example, at right angle or approximately right angle relative to each other.

Figure 7:
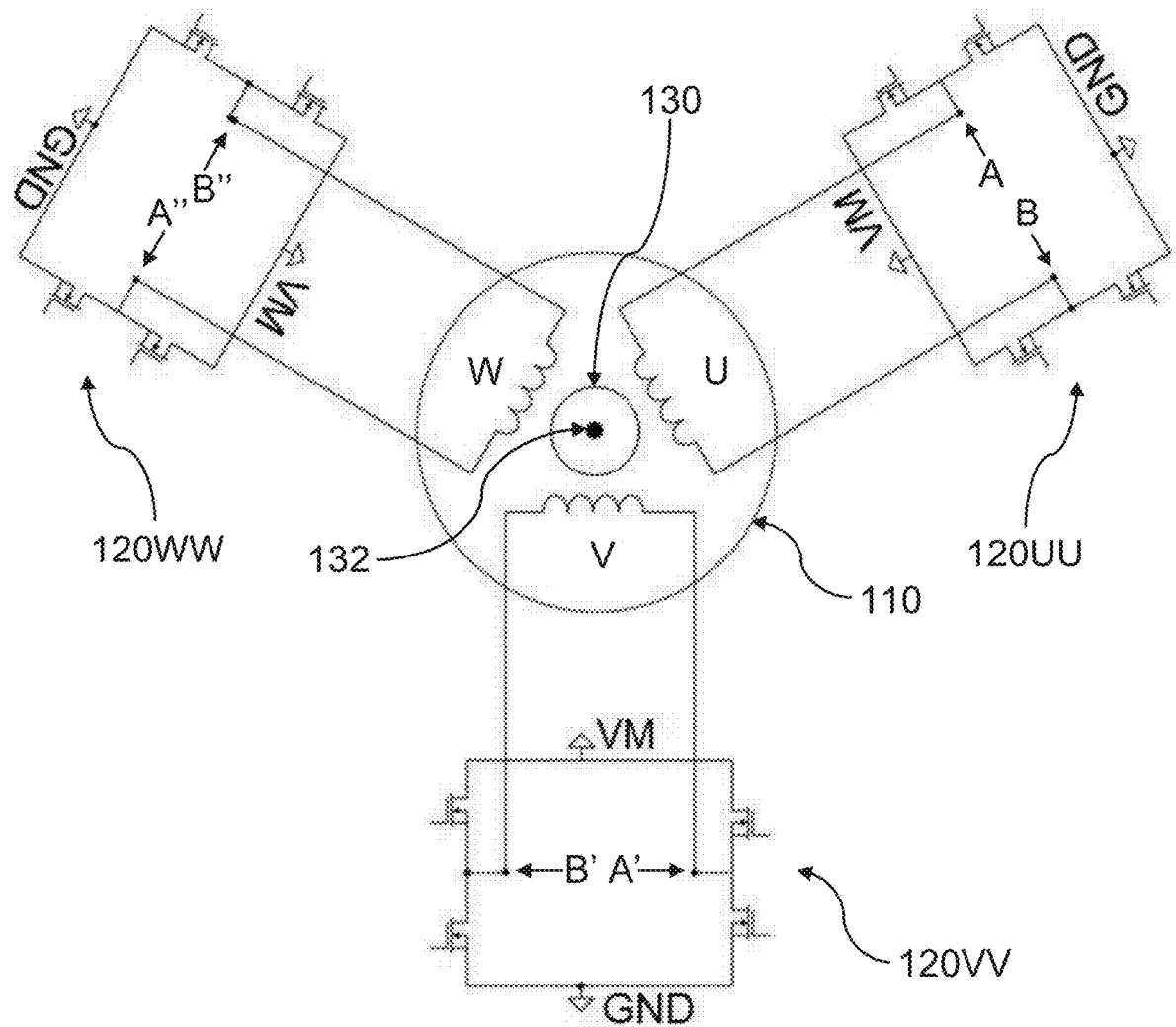
FIG. 7 is a schematic diagram of an example brushless DC motor of FIG. 2, FIGS. 8A1, 8A2 and 8A3 are schematic diagrams showing phase winding circuits and current sensing arrangements of the brushless DC motor of FIG. 7, FIGS. 8B1, 8B2 and 8B3 are schematic diagrams showing phase winding circuits and alternative current sensing arrangements of the brushless DC motor of FIG. 7, FIGS. 8C1, 8C2 and 8C3 are schematic diagrams showing phase winding circuits and further alternative current sensing arrangements of the brushless DC motor of FIG. 7.

An example brushless DC (BLDC) motor 100, 100' comprises an example plurality of three phase windings, U, V, W, as depicted in FIGS. 2 and 7. The phase windings are mounted on a motor housing 110 and are circumferentially distributed around the inner periphery of the motor housing 110. The motor housing in this example forms part of the stator and the example phase windings are distributed-ly mounted on an inner periphery of the motor housing such that the magnetic fluxes are to project radially inwardly towards the rotor, with a small radial air gap intermediate the phase windings and the rotor. The example phase windings are distributed with a nominal angular separation of approximately 120-degree between adjacent phase winding axes and surround the motor axis. Each phase winding is connected to a power supply circuit, which is one of the phase circuits of a multiphase power supply.

The example BLDC motor 100, 100' has a rotor 130 which carries a motor shaft, which is also a rotor shaft having a rotor axis 132, and a plurality of permanent magnets surrounding the motor shaft and the motor axis defined by the moor shaft. The permanent magnets are distributed on an outer periphery of the rotor to form a circular array of permanent magnets surrounding the motor shaft. Each permanent magnet is a rotor magnet having a first pole surface which is opposite facing the stator and a second pole surface which is facing away from the stator, the first pole surface has a first magnetic polarity and the second pole surface has a second magnetic polarity opposite to the first magnetic polarity. In this example embodiment, the rotor is mounted inside and rotatable relative to the motor housing and a pole surface of the permanent magnet which is facing the stator is an outward-facing pole surface which faces outwards and away from the rotor shaft. The outward-facing pole surface carries a magnetic polarity and magnetic flux which is to interact with the magnetic flux of a phase winding which is opposite facing and most proximal to the outward-facing pole surface. The interaction between the magnetic flux on the outward-facing pole surface of a rotor magnet and the magnetic flux of a proximal phase winding is to generate a drive torque in a tangential direction to drive the rotor to rotate.

In some embodiments, the motor housing forms an integral part of the rotor and is rotatable relative to the stator which is mounted inside the motor housing. In such embodiments, the phase windings are mounted on the stator, with the effective pole surfaces facing outwards, and the rotor magnets are distributed on the inner periphery of the motor housing, with the effective magnetic pole surfaces facing radially inwards towards the stator. An effective pole surface herein means a pole surface which is to enter into magnetic interaction with magnetic fluxes on a corresponding pole surface to generate a driving torque.

An example rotor magnet which forms part of the example rotor comprises a bar of permanent magnet ("magnet bar" in short). The magnet bar is elongate and extends in a direction which is parallel to and offset from the rotor shaft, and has an axial length comparable with the axial extent of the phase windings.

The rotor magnets are distributed to surround the rotor and the rotor axis and in a manner such that the stator-facing surface of the rotor forms a hybrid magnetic surface surrounding the rotor axis. The hybrid magnetic surface comprises elongate magnetic pole surfaces of opposite magnetic polarities and the elongate magnetic pole surfaces of opposite magnetic polarities are alternately disposed such that adjacent pole surfaces in the circumferential direction have opposite magnetic polarities, the circumferential direction being tangential or orthogonal to the rotor axis. In example embodiments, the elongate magnetic pole surfaces have uniform angular extent in the circumferential direction with respect to the rotor axis. In example embodiments, a magnetic pole surface on the rotor has a corresponding magnetic pole surface of opposite magnetic polarity on a diametrically opposite side of the rotor axis such that there is an even number of magnetic pole surfaces on the rotor periphery. For example, a rotor may have two, three, four, five, six, seven, eight, nine, ten, eleven twelve, etc., pairs of magnetic pole surfaces, each pair of magnetic pole surface comprises magnetic surface on opposite diametrical sides of the rotor axis.

Each phase winding U, V, W, is connected to a driving circuit 120U, 120V, 120W, to form a phase winding circuit 120UU, 120VV, 120WW, as depicted in FIG. 7. A driving circuit of the phase winding circuit is a phase circuit of a multiphase power supply 120 which when connected to an electrical power source is to supply driving power to power a phase winding, which is one of the motor windings of a multiphase BLDC motor. Each example phase circuit comprises a plurality of electronic power switches and the electronic power switches are arranged and configured to form a power bridge or a driving bridge, such as an H-bridge. The driving circuits of the plurality of phase windings are to cooperate to supply operation power to drive the rotor of the BLDC into load-driving rotation. The phase circuit of the multiphase power supply is to operate to supply power to drive a phase current through a phase winding and the power supplied by the phase circuit may be in the form of a sinusoidal voltage, or a non-sinusoidal voltage such as a train of square, triangular, parabolic, trapezoidal voltage waveform without loss of generality. The drive voltages in the different phase windings usually have the same waveform and the same amplitudes as well as the same amplitude range, but are at different time phases or phases in time.

An example driving circuit which is suitable for providing driving power to energize a BLDC phase winding is a power switching circuit which is to convert a direct current ("DC") power supply to a switched power supply output, as depicted in FIGS. 2, 3 and 7. The example driving circuit comprises a first supply rail, a second supply rail, a first output terminal, a second output terminal and a power switching circuit. The first supply rail and the second supply rail are for making electrical connections with a power supply so that electrical current can be drawn from the power supply to energize the phase winding after going through switching operations by the switching circuit. The first output terminal is connected with a first terminal of the phase winding and the second output terminal is connected with a first terminal of the phase winding. Each driving circuit comprises a closed circuit-loop which is formed by circuit connection of the phase winding and the driving circuit. The switching circuit comprises a plurality of electronic power switches and each electronic power switch has a switching terminal which is operable by a switching signal to switch the electronic power switch between an on-state and an off-state. Driving bridges such as the inverter bridges of FIGS. 2 and 7 are example driving circuits suitable for driving a BLDC motor. The driving bridge may be a unipolar H-bridge inverter of FIG. 2 or a full H-bridge of FIG. 7 without loss of generality. In the example embodiments of FIGS. 2 and 7, the first supply rail is a higher potential DC supply rail and the second supply rail is lower potential DC supply rail. In the embodiment of FIG. 2, the lower potential DC supply rail is tied to a reference ground GND of the driving circuit.

The example driving circuit comprises a first switching branch S1, S4 and a second switching branch S3, S2 which are connected in parallel. The first switching branch comprises a first switch S1 and a second switch S3 which are connected in series. The second switching branch comprises a first switch S3 and a second switch S2 which are connected in series. The switches are in series connection herein when the current paths are connected in series. The first switch S1, S3 of each switching branch is connected to the first supply rail such that its first terminal is tied to the voltage of the first supply rail. The second switch S4, S3 of each switching branch is connected to the second supply rail such that its second terminal is tied to the voltage of the second supply rail. In this example, the first supply rail is at a positive and higher supply voltage and the second supply rail is a ground, reference or zero voltage. During motor drive operations, the controller is to alternate between two switching modes. In the first switching mode, the controller turns on the switches S1 and S2, and turns off the switches S3 and S4, a phase current will flow from the first supply rail into the motor winding after passing through the first switch S1 and the first output terminal A and then flow out of the motor winding and flow into the second supply rail after passing through the second output terminal B and the second switch S2 of the second switching branch S3, S2. In the second switching mode, the controller turns on the switches S3 and S4, and turns off the switches S1 and S2, a phase current will flow from the first supply rail into the motor winding after passing through the first switch S3 and the second output terminal B and then flow out of the motor winding and flow into the second supply rail after passing through the first output terminal A and the second switch S4 of the first switching branch S1, S4.

During operations, a controller is to transmit switching signals to the switching terminals of the driving circuits to drive the phase windings. By alternating between the first and second switching mode, and by selecting the on-durations of the on-pulses which are to turn the switches to the on-state and on-durations of the off-pulses which are to turn the switches to the off-states, a driving voltage of a predetermined or selected waveform can be supplied. The controller 140 may be an FPGA controller of FIG. 2, a microprocessor-based controller or an ASIC controller without loss of generality.

In the example embodiments of FIGS. 2 and 7, the controller 140 is to transmit multiphase switching signals to control the plurality of driving circuits, which are the plurality of phase circuits, so that the driving circuits are to generate a multiphase power supply, with adjacent supply phases having an example phase difference of 2π/n, where n is number of phases of the BLDC motor. Where the BLDC has three phases, the phase difference between the output voltage of adjacent phase circuits is 2π/3, or 120 degrees.

Each phase winding comprises a phase winding first terminal (first terminal), a phase winding second terminal (second terminal) and a phase winding coil interconnecting the phase winding first terminal and the phase winding second terminal. During normal motor operations, a phase current is to flow from the phase circuit into the phase winding coil and the whole or entirety of the phase current will only flow through the phase winding coil and not another phase winding of another phase. More specifically, a phase current is to flow into the phase winding coil via the phase winding first terminal and leaves the phase winding via the phase winding second terminal and vice versa, so that no phase current is to enter or leave the phase winding without going through both the phase winding first terminal and the phase winding second terminal. This differs significantly from the star- or delta-phase winding connections of conventional BLDC motors in which a phase current flow through a phase winding will also flow in another phase winding of another motor phases or other phase windings of other motor phases. Since a phase current only flows through a single phase-winding, which is its own phase winding, problems due to harmonic currents and waste energy which are common in phase windings in star-connection or delta-connection of phase windings are largely mitigated.

Referring to FIGS. 2 and 7, each phase winding is a stand-alone phase winding, and the phase windings do not have inter-phase-winding connection, such as inter-phase-winding connection node (common node). Because the phase windings have no common node or inter-phase-winding electrical connection, each phase winding operates independently and inter-phase-winding interferences, for example, inter-phase-winding current interferences are substantially mitigated. A multiphase BLDC motor having independent phase windings is advantageous since improvements in power efficiency, purity in driving current and less noise are expected. The independent phase windings facilitate simpler motor control methodology and circuits and therefore confers advantages.

Each of the example phase driving circuits of FIGS. 3 and 7 comprises a switching bridge having a first output terminal A and a second output terminal B. The example switching bridge of FIG. 3 has bipolar transistors as electronic switches while the example switching bridge of FIG. 7 has FETs (field effect transistors), such as MOSFETs, as electronic switches. The example BLDC of FIGS. 2, 3 and 7 comprises a first phase winding circuit 120UU, a second phase winding circuit 120VV, and a third phase winding circuit 120WW. Each phase winding has a corresponding phase circuit. The phase winding and its corresponding phase circuit are connected to form a phase winding circuit 120UU, 120VV, 120WW. Each phase winding circuit of the multiphase BLDC motor is an independent phase winding circuit having no inter-phase connection such that a phase current flowing in a phase winding does not have a phase current branch or a phase current component in another phase winding of a different phase. The phase circuit of a phase winding circuit 120UU, 120VV, 120WW is dedicated for that phase winding circuit 120UU, 120VV, 120WW and does not supply phase current to another phase winding circuit, as is evident from FIGS. 2, 3 and 7.

In the examples, the phase winding first terminal is connected (means electrically connected herein) to the phase circuit first output terminal A and the phase winding second terminal is connected to the phase circuit second output terminal B such that each phase winding circuit 120UU, 120VV, 120WW is a closed-loop circuit in which the phase current only flows in a loop defined by the phase winding circuit 120UU, 120VV, 120WW. With closed-loop arrangement of the phase winding circuits 120UU, 120VV, 120WW, there is no flow of phase currents across or between different phase winding circuits 120UU, 120VV, 120WW and the purity of driving currents in the different phase windings are enhanced.

In example BLDC motors such as those disclosed herein, the controller 140 during motor operations is to execute stored instructions to transmit a train of switching signals to operate the electronic power switches of the driving bridge. An electronic switch S1, S2, S3, S4, forming part of a phase current path of a phase circuit comprises a first terminal, a second terminal and a third terminal. The first terminal and the second terminal are current terminals through which the phase current is to flow. The third terminal is a control terminal or a switching terminal which is to switch the electronic switch between an on-state during which the phase current is to flow through the switch and an off-state during which the switch becomes a high impedance device allowing no flow of phase current therethrough.

In example operations, as depicted in FIG. 4, the controller 140 is to transmit a train of switching pulses to the control terminals g1, g2, g3, g4, such that a sinusoidal output voltage appears across at the phase circuit first output terminal A and the phase circuit second output terminal B. The sinusoidal output voltage is a train of PWM pulses having a mark-and-space ratio to simulate a pure sinusoid. The PWM pulses have a uniform amplitude but different on-duration to construct a sinusoidal voltage waveform. It is desirable, if not absolutely necessary, to know the rotor position in order for the controller to supply driving signals to facilitate a smooth or ripple-free drive of a BLDC motor. The rotor position herein is a relative position between the rotor and the stator. The relative position may be the angular position of the rotor relative to the stator, the relative angular position between a reference rotor magnet and a reference phase winding, or other relative angular positions suitable to facilitate motor control.

Rotor position may be determined with reference to the instantaneous phase current, which is the instantaneous current flowing in the phase winding.

Referring to FIGS. 8A1, 8A2 and 8A3, each phase winding circuit 120UU, 120VV, 120WW is provided with a current sensor 122U, 122V, 122W, to facilitate detection of current through the phase winding U, V, W. The example current sensor is a current sensing resistor which is in series connection with the phase winding circuit 120UU, 120VV, 120WW. Because of the series connection, a current flowing through the phase winding will result in a corresponding current flowing through the current sensor. The current sensor 122U, 122V, 122W, is connected at a downstream end of the driving circuit, and more specifically, between the downstream end of the driving bridge and the second supply rail, which is a GND (ground) rail at a reference voltage level.

The example phase driving circuit comprises a first switching branch S1, S4 and a second switching branch S3, S2 which are connected in parallel. The first switching branch comprises a first switch S1 and a second switch S4 which are connected in series. The second switching branch comprises a first switch S3 and a second switch S2 which are connected in series. The switches are in series connection herein when the current paths are connected in series. The first switch S1, S3 of each switching branch is connected to the first supply rail such that its first terminal is tied to the voltage of the first supply rail when the first switch S1, S3 is turned on. The second switch S2, S4 of each switching branch is connected to the second supply rail via a current sensing resistor 122U, 122V, 122W. The second terminals of the second switches S2, S4 and the output terminal of the current sensing resistor 122U, 122V, 122W are connected together to form a common node, which is also the output node of the current sensor 122U, 122V, 122W. The output node of the current sensor in this example is the higher potential node of the current sensor resistor 122U, 122V, 122W. The phase winding U, V, W is connected across the two phase-driving circuit output terminals A, B to obtain drive current, which is the phase current of the phase winding circuit 120UU, 120VV, 120WW.

When the second switch S2, S4 is turned on, the second terminal of the second switch S2, S4 which is turned on is at a sensor output voltage above the voltage of the second supply rail. When the second switch S2, S4 is turned off, the second terminal of the second switch S2, S4 which is turned off is tied to the second supply rail and has the voltage of the second supply rail, which is a reference ground in this example.

When a first switch pair S1, S2 of the switching bridge is turned on and stays in the on-state and a second switch pair S3, S4 of the switching bridge is turned off and stays in the off-state during a first switching mode when in power supply switching operations, a phase current will flow through the first switch pair S1, S2, and no phase current will flow through the second switch pair S3, S4. When in this first operation mode, motor driving phase current flows across the phase winding U, V, W in a phase direction from terminal B to terminal A. The voltage at the second terminal of the second switch S2, S4 which is also the output voltage of the current sensor 122U, 122V, 122W, is equal to the magnitude of the phase current multiplied by the value of the current sensor resistor, i.e., $i_{phase} \times R_{sense}$, where $i_{phase}$ is the instantaneous phase current flowing in the phase winding and $R_{sense}$ is the resistance value of the current sensor 122U, 122V, 122W.

During a second switching mode of the phase driving circuit when in power supply switching operations, the first switch pair S1, S2 of the switching bridge is turned off and stays in the off-state and the second switch pair S3, S4 of the switching bridge is turned on and stays in the on-state when in power supply switching operations. When in this second operation mode, motor driving phase current flows across the phase winding U, V, W in a phase direction from terminal A to terminal B, that is, in a second phase current direction which is opposite to the first phase current direction of the first switching mode. The voltage at the second terminal of the second switch S2, S4, which is also the output voltage of the current sensor 122U, 122V, 122W, is also equal to the magnitude of the phase current multiplied by the value of the current sensor resistor, i.e., $i_{phase} \times R_{sense}$, where $i_{phase}$ is the instantaneous phase current flowing in the phase winding and $R_{sense}$ is the resistance value of the current sensor 122U, 122V, 122W. It will be appreciated that the phase current sensor output is unipolar, that is, has a single polarity, which is a positive polarity irrespective of the phase current direction.

The current flowing through the current sensor can be used to determine the instantaneous rotor position and hence the driving signals to be sent to drive the phase windings, for example, using field-oriented control (FOC) techniques or other closed-loop control techniques. The output of the current sensor is in the form of an analog voltage signal, and the analog signal is converted into a digital data suitable for processing by the controller, optionally after the analog signal has been amplified by a signal amplifier. The digital data is converted from its analogue counterpart by an analog-to-digital converter (ADC) in cooperation with a sample-and-hold circuit device. The example current sensor has a first terminal and a second terminal. The example signal amplifier has a first input terminal and a second input terminal. The sensor first terminal is connected to the amplifier first input terminal and the sensor second terminal is connected to the amplifier second input terminal such that the voltage drop across the current sensor is amplified for subsequent digital conversion.

FIGS. 8B1, 8B2 and 8B3 show an alternative circuit arrangement of the phase winding circuits comprising means for measuring the instantaneous phase current. The circuit arrangement, switching operations, and the switching operation modes are substantively identical to that of FIGS. 8A1, 8A2 and 8A3, except that the current sensor is serially connected upstream of the driving bridge, with the difference that the current sensor of FIGS. 8A1, 8A2 and 8A3 is connected at the downstream end of the driving bridge, the downstream end being the end connected to the second supply rail. The arrangements of FIGS. 8B1, 8B2 and 8B3 are conveniently referred to as "high side" measurement arrangement herein while those of FIGS. 8A1, 8A2 and 8A3 are conveniently referred to as "low side" measurement arrangement herein. In this "high side" measurement arrangement, the first terminals of the first switches S1, S3 of the first and second switching branches are connected to the first supply rail via the current sensing resistor 122U, 122V, 122W, the second switches S2, S4 of the first and second switching branches are connected to the second supply rail without an intermediate resistor between the second supply rail and the second switches, and the current sensor output is at a lower potential terminal of the current sensing resistor 122U, 122V, 122W, or the first terminals of the first switches S1, S3. Otherwise, description herein on and in relation to the phase driving circuits of FIGS. 8A1, 8A2 and 8A3 are incorporated herein by reference and to apply mutatis mutandis without loss of generality.

FIGS. 8C1, 8C2 and 8C3 show an alternative circuit arrangement of the phase winding circuits comprising means for measuring the instantaneous phase current. In this circuit arrangement, the current sensor is connected in series with the phase winding U, V, W, and the series connection comprising the current sensor and the phase winding U, V, W, is connected to the first and second output terminals of the driving bridge. The arrangements of FIGS. 8C1, 8C2 and 8C3 are conveniently referred to as an "internal" measurement arrangement herein. The circuit arrangement, switching operations, and the switching operation modes of this internal measurement arrangement are substantively identical to those of FIGS. 8A1, 8A2 and 8A3, except that the phase current is measured between the two terminals of the current sensing resistor 122U, 122V, 122W. In the embodiment of FIGS. 8C1, 8C2 and 8C3, a first terminal of the phase winding is connected to second output terminal B of the driving circuit, and the current sensor has a first terminal which is connected to the second terminal of the phase winding which is not connected to the output terminal B and a second terminal which is connected to the first output terminal A of the driving circuit. In some embodiments, the current sensor has the first terminal connected to the output terminal B of the driving circuit and the phase winding U, V, W has its second winding terminal connected to the first output terminal A of the driving circuit.

Figure 8D:
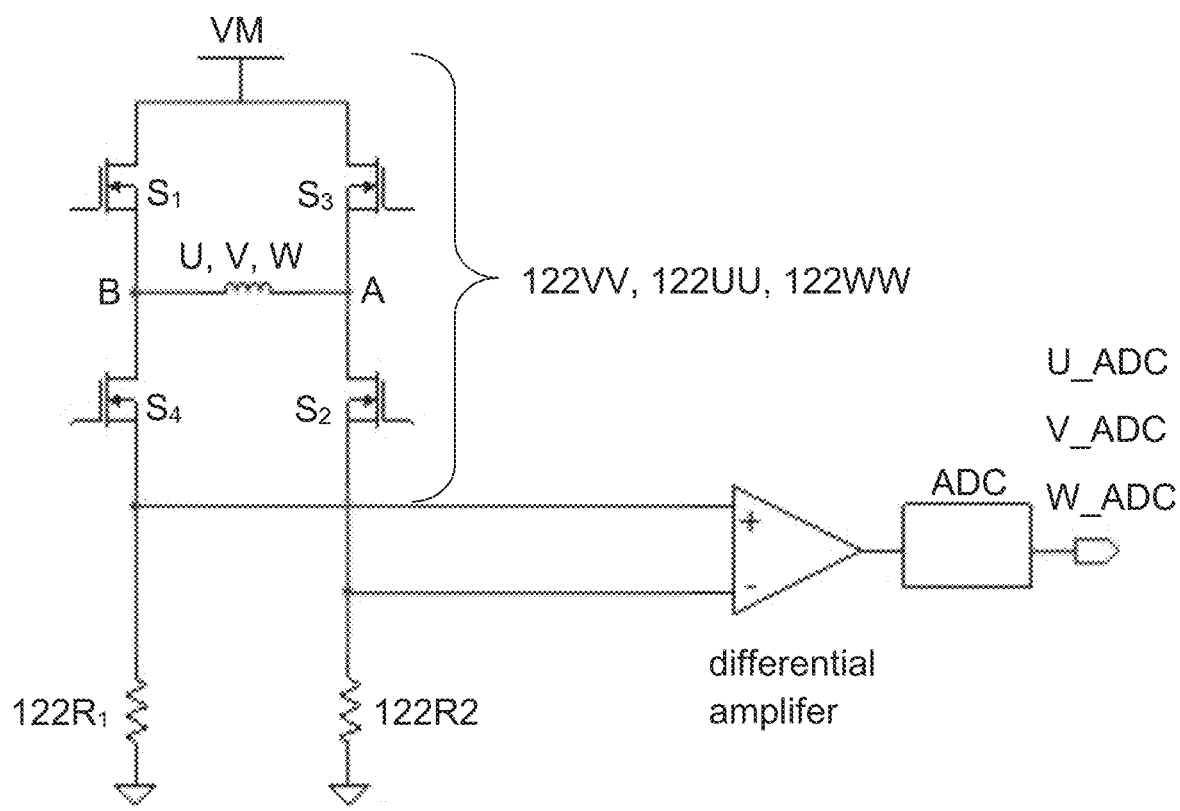
FIG. 8D is a schematic diagram of a phase winding circuit comprising an example digital phase current output.

An example phase driving circuit comprises a first switching branch S1, S4 and a second switching branch S3, S2 which are connected in parallel, as depicted in FIG. 8D. The first switching branch comprises a first switch S1 and a second switch S4 which are connected in series. The second switching branch comprises a first switch S3 and a second switch S2 which are connected in series. The switches are in series connection herein when the current paths are connected in series. The first switch S1, S3 of each switching branch is connected to the first supply rail such that its first terminal is tied to the voltage of the first supply rail. The second switch S4, S2 of each switching branch is connected to the second supply rail via a current sensor resistor 122R1, 122R2.

When the first switch pair S1, S2 of the switching bridge is turned on and stays in the on-state, and the second switch pair S3, S4 of the switching bridge is turned off and stays in the off-state during a first switching mode when in power supply switching operations, a phase current will flow from the first supply rail, through the first switch pair S1, S2 and the phase winding U, V, W, and finally return to the second power supply rail via the second current sensing resistor 122R2, and no phase current will flow through the second switch pair S3, S4 or the first current sensor resistor 122R1. When in this first operation mode, motor driving phase current flows across the phase winding U, V, W in a phase direction from terminal B to terminal A. The voltage at the second terminal of the second switch S2, which is also the output voltage of the second current sensing resistor 122R2, is equal to the magnitude of the phase current multiplied by the value of the current sensor resistor, i.e., $i_{phase} \times R_{sense}$, where $i_{phase}$ is the instantaneous phase current flowing in the phase winding and $R_{sense}$ is the resistance value of the current sensor 122U, 122V, 122W. When in this operation mode, the second switch S4 of the first switching branch is turned off and stays in the off-state, the voltage of the first sensor resistor 122R1 is tied to the voltage of the voltage of the second supply rail. Because output of the first sensor resistor 122R1 is connected to the positive input of the differential amplifier, and output of the second sensor resistor 122R2 is connected to the negative input of the differential amplifier, the differential amplifier has a negative voltage output when in this switching mode.

When the first switch pair S1, S2 of the switching bridge is turned off and stays in the off-state, and the second switch pair S3, S4 of the switching bridge is turned on and stays in the on-state during a first switching mode when in power supply switching operations, a phase current will flow from the first supply rail, through the second switch pair S3, S4 and the phase winding U, V, W, and finally return to the second power supply rail via the first current sensing resistor 122R1, and no phase current will flow through the first switch pair S1, S2 or the second current sensor resistor 122R2. When in this first operation mode, motor driving phase current flows across the phase winding U, V, W in a phase direction from terminal A to terminal B. The voltage at the second terminal of the second switch S4, which is also the output voltage of the first current sensing resistor 122R1, is equal to the magnitude of the phase current multiplied by the value of the current sensor resistor, i.e., $i_{phase} \times R_{sense}$, where $i_{phase}$ is the instantaneous phase current flowing in the phase winding and $R_{sense}$ is the resistance value of the current sensor 122U, 122V, 122W. When in this operation mode, the second switch S2 of the second switching branch is turned off and stays in the off-state, the voltage of the second sensor resistor 122R2 is tied to the voltage of the voltage of the second supply rail. Because output of the first sensor resistor 122R1 is connected to the positive input of the differential amplifier, the differential amplifier has a positive voltage output when in this switching mode. Compared to the embodiments of FIGS. 8A1, 8B1 and 8C1, the phase current sensor output is bipolar and has polarities following the polarities of the drive current to facilitate simpler processing of the phase current digital data output.

Therefore, when the first switch S1 or S3 of one of the switching branches is turned on to the on-state and stays in the on-state, with the corresponding second switch S2 or S4, respectively, of the other one of the switching branches turned on to the on-state and stays in the on-state, and with the remaining switches of the switching bridges turned off and stay in the off state, during power supply switching operations, a phase current will flow through the first switch and its corresponding second switch, and the voltage at the second terminal of the second switch S4, S2 is equal to the magnitude of the phase current voltage multiplied by the value of the current sensor resistor 122R1, 122R2, i.e., $i_{phase} \times R_{sense}$, where $i_{phase}$ is the instantaneous phase current through the phase winding and $R_{sense}$ is the resistance value of the sensor resistor 122R1, 122R2. The switching modes and switching operations of this phase driving circuit is otherwise similar to the phase driving circuits of FIGS. 8A1, 8A2 and 8A3. When the second switch S4, S2 is turned off into the off-state during power supply switching operations, no phase current will flow through the second switch and the voltage at the second terminal of the second switch S4, S2 is equal to the voltage of the second supply rail. The switching modes and switching operations of this phase driving circuit is otherwise similar to the phase driving circuits of FIGS. 8A1, 8A2 and 8A3. The descriptions thereon and thereabout are incorporated herein by reference and to adapt mutatis mutandis, without loss of generality.

The voltage outputs of the sensing resistors 122R1, 122R2 are fed to the input terminals of a differential amplifier. The different amplifier signal output is then processed by an ADC to obtain raw digital data U_ADC, V_ADC and W_ADC of the instantaneous phase current $i_{phase}$ flowing through the different phase windings U, V, W.

In example embodiments, the 3-dimensional current vectors $i_u$, $i_v$, $i_w$, obtained by measurement of the phase currents in the 3 phase windings U, V, W, respectively are transformed into a rotating 2-dimensional current vector, namely, $i_\alpha$ and $i_\beta$. The 2-dimensional rotating current vector, $i_\alpha$, $i_\beta$ is then transformed by the Park Transform to produce a stationary 2-dimensional current vector $i_d$, $i_q$. The 2-dimensional stationary current vector $i_d$, $i_q$ is then fed into PI (proportional and integral) or PID (proportional, integral and derivative) loops, control loops, and/or regulators to facilitate, for example, constant torque and constant speed control.

The accuracy of rotor position is largely affected and determined by the accuracy of the phase current. Therefore, the accuracy in measured phase current is pivotal in facilitating good motor control.

However, the voltage reference levels (for example, zero voltage reference levels) of the signal amplifiers and the ADCs may not be the same, and may be different or affected by operating temperatures. The differences will introduce signal noise and result in digital errors.

In example embodiments, each of the phase windings U, V, W is driven by a sinusoidal driving voltage, such that, $$v_U = \sin A,$$

$$v_V = \sin\left(A + \frac{2\pi}{3}\right) =$$

$$\sin A \times \cos\left(\frac{2\pi}{3}\right) + \cos A \times \sin\left(\frac{2\pi}{3}\right) = -.05\sin A + 0.866\cos A, \text{ and}$$

$$v_W = \sin\left(A - \frac{2\pi}{3}\right) = \sin A \times \cos\left(\frac{2\pi}{3}\right) -$$

$$\cos A \times \sin\left(\frac{2\pi}{3}\right) = -.05\sin A - 0.866\cos A,$$

wherein $v_U$, $v_V$, $v_W$ are, respectively, supply voltages at the output terminals of the driving circuits 120U, 120V, 120W or drive voltages across the phase windings, and $A = \omega t$, where $\omega$ is the frequency of the sinusoidal supply voltage and t is time. The voltages $v_U$, $v_V$, $v_W$ are also the phase winding terminal voltage appearing at the phase winding first and second terminals, which is equal to $V_{AB}$ of FIG. 3.

By selecting variable if, U', V', W', and U", V", W", such that $$U' = v_V - v_W = 2 \times 0.866 \cos A$$

$$V' = v_W - v_U = -1.5 \sin A - 0.866 \cos A$$

$$W' = v_U - v_V = +1.5 \sin A - 0.866 \cos A, \text{ and such that}$$

$$U'' = W' - V' = 3 \sin A = 3v_U$$

$$V'' = U' - W' = -1.5 \sin A + 3 \times 0.866 \cos A = 3v_V$$

$$W'' = V' - U' = -1.5 \sin A - 3 \times 0.866 \cos A = 3v_W$$

It follows that:

$$v_U = (\tfrac{1}{3})U''$$

$$v_V = (\tfrac{1}{3})V''$$

$$v_W = (\tfrac{1}{3})W''$$

Figure 9:
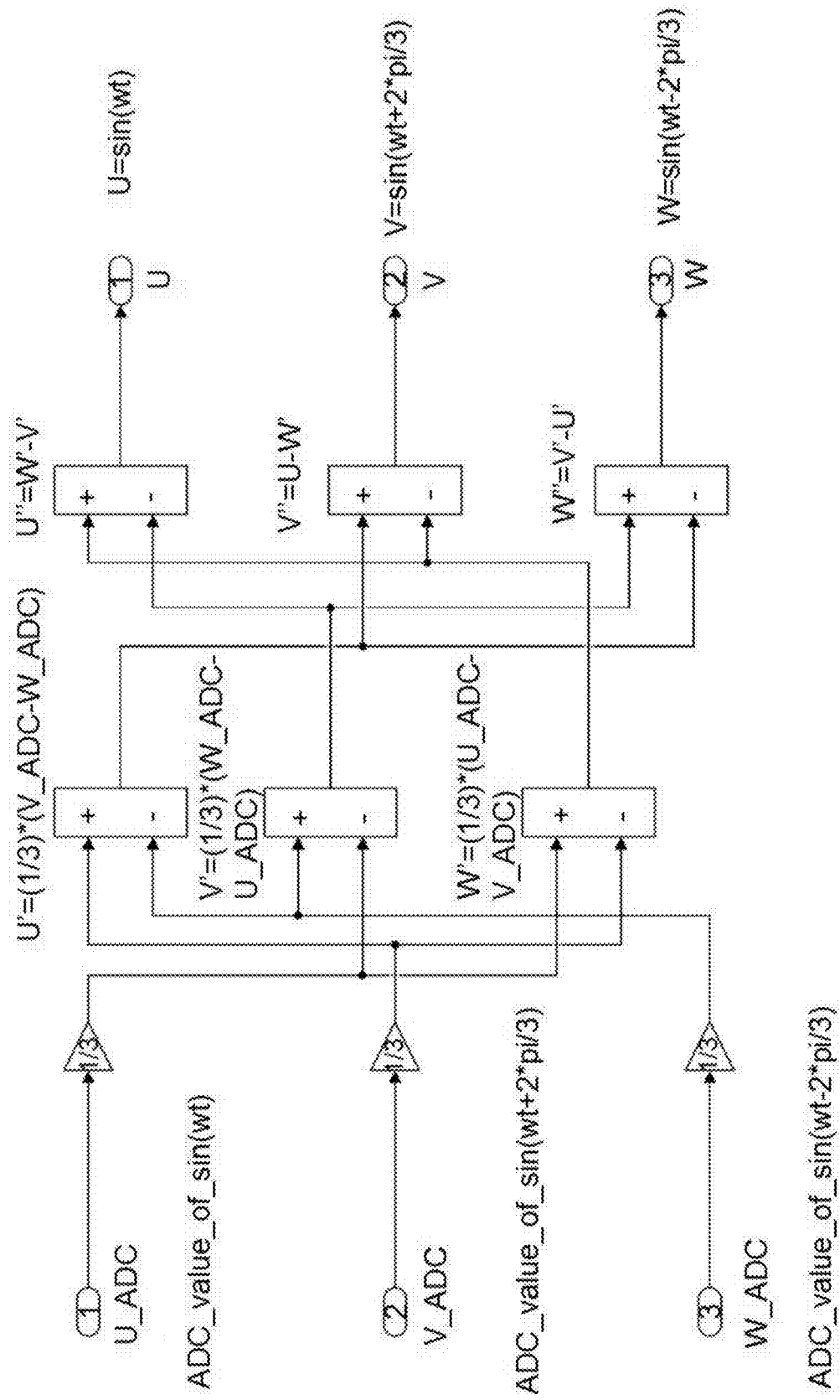
FIG. 9 is a schematic diagram showing circuit implementation to facilitate measurement of phase currents in the brushless DC motor of FIG. 7 with circuitry implemented to mitigate common mode errors.

A circuit implementation of the above is depicted in FIG. 9. The circuit implementation of FIG. 9 facilitates measurement of phase currents using relative values between the phase windings as set out in the relationships herein, thereby mitigating errors due to change or fluctuation in operation temperatures.

Referring to FIG. 9, the raw digital data U_ADC, V_ADC, W_ADC of the phase currents from the phase current sensors, or more exactly the digital output terminals of the current sensor circuits, of the arrangement of FIG. 8A1 to 8A3, 8B1 to 8B3, 8C1 to 8C3, or 8D are fed to a mathematical processing network to obtain the current outputs U, V, W, where U is the phase current corresponding to the sensor voltage output $v_U$, V is the phase current corresponding to the sensor voltage output $v_V$, and W is the phase current corresponding to the sensor voltage output $v_W$. The example mathematical processing network comprises a plurality of dividers and a plurality of addition and subtraction devices which are constructed to perform the mathematical operations above to obtain the real phase currents with errors due to temperature draft etc. mitigated, if not eliminated. The example mathematical processing network comprises a first layer which is a divider layer comprising an example plurality of three dividers for the three phases, with an example dividing factor of 3. Output of the dividing devices of the divider layer are fed into a second mathematical processing layer of addition and subtraction devices, and output of the second layer are fed into a third mathematical processing layer of addition and subtraction devices to give the real phase current outputs.

The second layer of mathematical operations, which is the first layer of addition and subtraction operations, is to obtain the first level variables U', V' and W' using the raw digital output data of all the three phase winding currents, namely U_ADC, V_ADC and W_ADC, where U'=(V_ADC−W_ADC)/3, V'=(W_ADC−U_ADC)/3 and W'=(U_ADC−V_ADC)/3.

The third layer of mathematical operations, which is the second layer of addition and subtraction operations, is to obtain the second level variables U", V" and W" using the first level variables U', V' and W' obtained from the first layer of addition and subtraction operations, where U"=W'−V', V"=U'−W' and W"=V'−U'.

The less error prone phase current data $v_U$, $v_V$, $v_W$, which are referred to as "real phase current data" herein are obtained by processing of the second level phase current variables U", V" and W", as depicted in FIG. 9 or as above, where $v_U=(1/3)U"$, $v_V=(1/3)V"$ and $v_W=(1/3)W"$.

The mathematical processing network may be software based, hardware based or both software and hardware based without loss of generality.

By processing the various sensor output data in a relative manner, common-mode errors (including errors due to difference in voltage reference levels, ADC zero levels and temperature drifts) are substantially mitigated, if not eliminated, thereby enhancing accuracy and reliability of control data to facilitate better motor control.

Figure 9A:
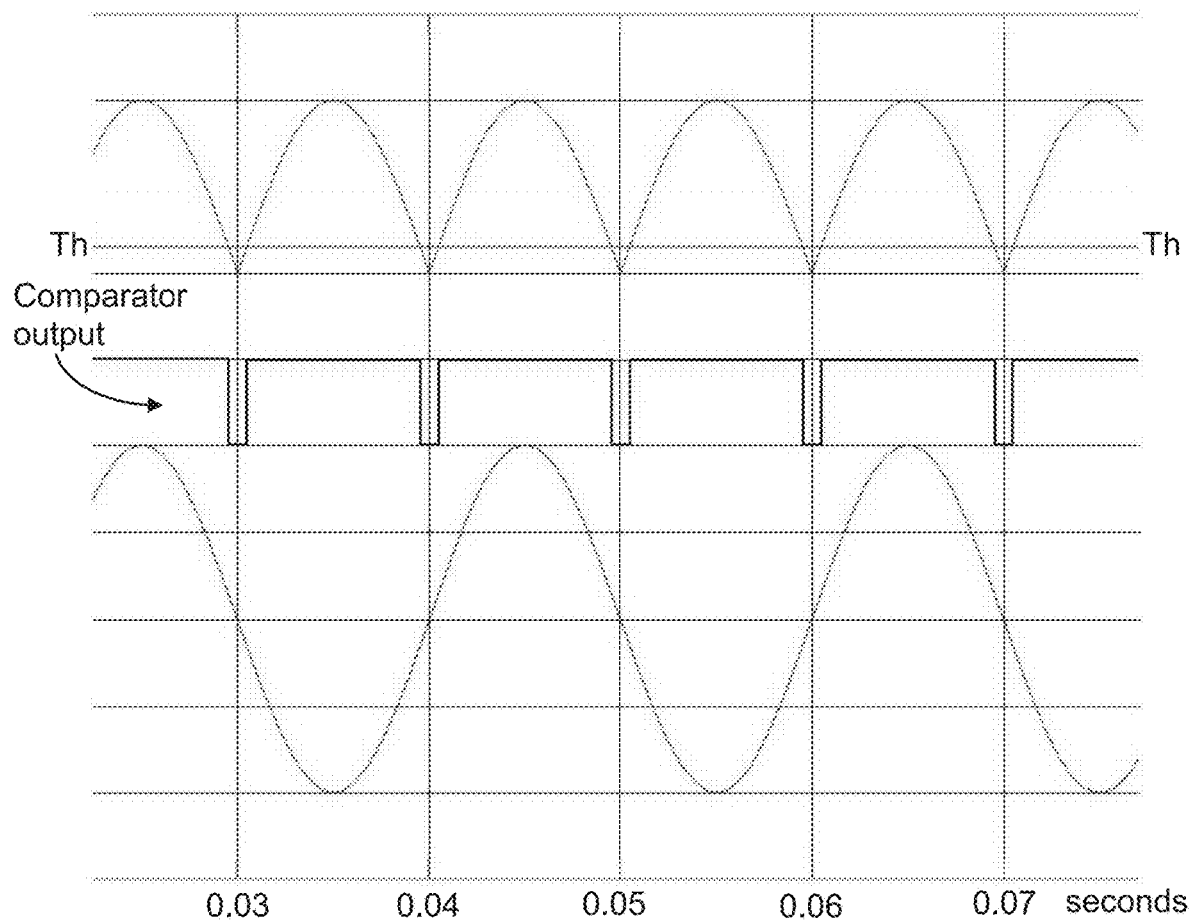
FIG. 9A is a schematic diagram showing measured phase currents and a train of thresholds for determining half-cycle polarity.
Figure 10:
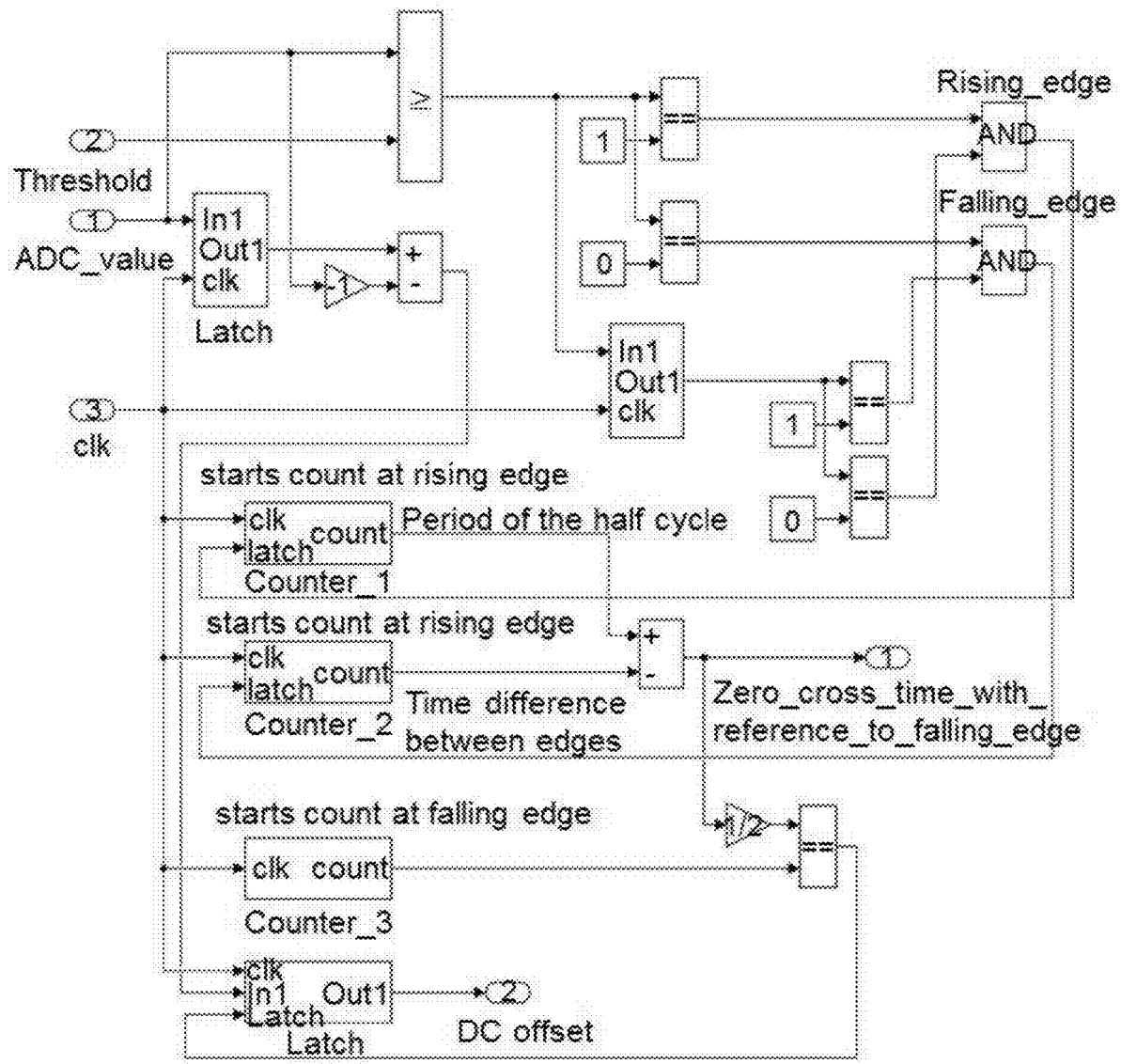
FIG. 10 is schematic diagram showing circuit implementation of a current zero-crossing detection circuit.

The example high side measurement arrangement and the low side current measurement herein will give a positive portion of the phase current. The negative portion of the phase current would need to be re-constructed before the phase currents are transformed. In order to identify the current zero crossing of the high side and/or low side measurements, the data is compared to a threshold Th, if the data is greater than the threshold, it is taken as a high level, otherwise it is taken as a low level, as depicted in FIG. 10. Half of the times between the transition from high level to low level and between the transition from the low level to high level will be taken as the time of zero-crossing. Referring to FIG. 9A, the measured phase current waveform is depicted on the first (or upper) row and comprises a train of half (positive-half) sinusoids. The signals on the second row are comparator output of the signal of the first row with reference to a threshold level Th. The signals on the third or lowest row is a train of sinusoidal phase current reconstructed from the measured half-sinusoidal phase current with reference to a threshold level. The signals on the first row are digital data of an example phase current reconstructed using the mathematical processing network of FIG. 9 with raw digital data output of the example phase current sensing digital outputs of FIGS. 8A, 8B, 8C and 8D. The signals have a single polarity (that is, positive only) because the current sensing arrangement is a unipolar arrangement. In order to reconstruct a full phase current using the unipolar current data obtained from the phase current sensing phase circuits and subsequent data processing by the mathematical processing network, the polarity of the real phase current output by the mathematical processing network of FIG. 9 needs to be determined. The signals on the second or middle row of FIG. 9A are decision outputs of a comparator, which uses a reference threshold to facilitate decision making on whether the signal on the first row is equal to, above or below a threshold. The comparator output signals are bi-level signals. When the level of the signals on the first row is equal to or above the threshold value, the output of the comparation is set to a first level, which is a high level in this example. When the level of the signals on the first row is less than the threshold value, the output of the comparation is set to a second level, which is a low level in this example. In some embodiments, the comparator may be set such that when the level of signals on the first row is above the threshold value, the output of the comparation is set to the first level, and when the level of the signals on the first row is less than or equal to the threshold value, the output of the comparation is set to the second level. The duration during which the level of signals falls below the threshold level is a transition duration during which transition between positive to negative or negative to positive phase current occurs. This transition duration is used to facilitate determination of time of transition between positive-to-negative phase current transition as well as negative-to-positive transition to facilitate controller-based reconstruction of a full bi-polar phase current to facilitate more accurate rotor position determination.

In order to determine the polarity of the real phase current output, reference may be made by the controller to the phase and phase angle of a corresponding phase driving voltage, since the controller is the source of the phase driving voltages.

In order to determine which part of a half current cycle is to be flipped (that is, to change from positive to negative), information on the rotor angle with reference to the driving voltage is utilized. For example, if the current zero crossing occurs when the voltage angle (with zero angle offset, U=sin(ωt)) is between 0 degree and 180 degree, the next zero crossing will be taken as the negative current. For non-perfect sinusoidal current, there will be an offset value at the zero cross point, in order to find out this value, previous current readings are stored and compared to the present value which is the current value immediately after the zero crossing, the value of this offset is found to be equal to previous value minus the negative of the present value (or simply previous value plus present value). The output of the reconstructed current should subtract this value in order to have no offset (zero DC offset).

The reconstructed phase currents with complete phase information are then utilized to determine the rotor position.

While the disclosure is with reference to example embodiments and example operations described herein, one of ordinary skill in the art would appreciate that the principles disclosed herein are equally applicable to other drive voltage waveforms, including trapezoidal and other waveforms without loss of generality. For example, while the example phase drive voltage is a sinusoidal voltage, the disclosure herein applies mutatis mutandis to non-sinusoidal phase drive voltages such as trapezoidal, parabolic, square drive voltage pulses without loss of generality.

Described above are only preferred embodiments of the present invention, and any equivalent changes and modification made within the scope of the claims of the present invention shall be covered by the scope of the claims of the present invention.

The invention claimed is:

1. A BLDC motor comprising a permanent magnet motor rotor defining a motor axis, a motor housing and a plurality of phase winding circuits mounted on the motor housing to form a stator, and a controller; wherein each phase winding circuit comprises a phase winding, a driving bridge which is to operate to drive a phase current to flow through the phase winding, and a current sensor for sensing amplitude of a phase current flowing through the phase winding, wherein the driving bridge comprises a switching circuit to provide a switched power supply to energize the phase winding; wherein the phase windings are disposed at different angular positions with respect to the motor axis or the motor housing, and wherein the controller is configured to use the amplitude of the phase current sensed by the current sensor to determine the instantaneous position of the motor rotor.

2. The motor according to claim 1, wherein the plurality of phase winding circuits comprises a first phase winding circuit which is disposed at a first angular position with respect to the motor axis, a second phase winding circuit which is disposed at a second angular position with respect to the motor axis, and a third phase winding circuit which is disposed at a third angular position with respect to the motor axis; and wherein the first angular position, the second angular position and the third angular position are different angular positions with respect to the motor axis.

3. The motor according to claim 2, wherein each phase winding comprises a motor winding having a motor winding first terminal and a winding second terminal which cooperate to delimit the motor winding, and wherein the motor winding and the driving bridge forms a closed loop in side which a phase current of the phase winding circuit is to flow.

4. The motor according to claim 2, wherein the phase winding comprises a motor winding having a motor winding first terminal and a motor winding second terminal which are end terminals of the motor winding, and wherein the switching circuit comprises a switching circuit first terminal which is connected to the motor winding first terminal and a switching circuit second terminal which is connected to the motor winding second terminal such that a phase current to flow in the phase winding is to flow between the motor winding and the driving bridge in a closed loop, and does not flow into a motor winding of another phase winding circuit.

5. The motor according to claim 2, wherein adjacent phase windings are independent and not interconnected and have no common node through which a common phase current is to flow.

6. The motor according to claim 2, wherein the motor further comprises a motor controller, and wherein the motor controller is to operate electronic power switches of the switching circuit to switch a power supply to generate a multi-phase drive voltage to drive the plurality of phase winding circuits phase windings.

7. The motor according to claim 6, wherein the drive voltage is a train of trapezoidal-shaped voltage pulses or a train of sinusoidal voltages.

8. A BLDC motor comprising a permanent magnet motor rotor defining a motor axis, a motor housing, a plurality of phase winding circuits mounted on the motor housing to form a stator, and a controller, wherein each phase winding circuit comprises a phase winding and a driving bridge which is to operate to drive a phase current to flow through the phase winding, and the driving bridge comprises a switching circuit to provide a switched power supply to energize the phase winding; and wherein the phase windings are disposed at different angular positions with respect to the motor axis or the motor housing; wherein each phase winding circuit comprises a current sensor for sensing value or amplitude of a phase current flowing through the phase winding, and an analog-to-digital converter for converting the value or amplitude of the sensed phase current value into a digital current data, and wherein the controller is configured to operate to process the digital current data of the plurality phase winding circuits to determine individual phase currents of the plurality of phase windings to determine angular position of the motor rotor.

9. The motor according to claim 8, wherein the motor comprises an addition and subtraction network and the controller is to operate the network to facilitate processing of the digital current data of the plurality of phase windings to obtain individual phase currents of the plurality of phase windings.

10. The motor according to claim 8, wherein the current sensor is a unipolar current sensor which gives a unipolar current signal, and wherein the controller is to determine polarity of the digital current data and to reconstruct a bi-polar phase current using the unipolar digital current data.

11. The motor according to claim 10, wherein the controller is to determine polarity of the digital current data with reference to a threshold value, wherein current data higher than the threshold is taken as a first polarity and current data lower than the threshold is taken as a second polarity opposite to the first polarity, and wherein the controller is to convert the current data lower than the threshold as digital current data of the second polarity, and to reconstruct the phase current combining the digital current data of the first and second polarity.

12. The motor according to claim 11, wherein the controller is to take the first polarity as positive polarity and the second polarity as negative polarity.

13. The motor according to claim 11, wherein the controller is to determine zero crossing of the phase current with reference to the digital current data, and wherein the controller is to determine transition between digital current data of the first polarity.

14. The motor according to claim 13, wherein the controller is to take half the time between transitions from high level to low level and low level to high level as time of zero-crossing.

15. The motor according to claim 11, wherein the controller is to determine phase current zero crossing with reference to phase angle of the drive voltage.

16. A multi-phase brushless direct current motor, comprising:
 a motor body, a permanent magnet motor rotor, a controller and a driving module, said driving module comprising a plurality of phase coil windings each of which has two ends and a phase winding circuit;
 the driving module further comprising a plurality of H-bridge unipolar inverters, each of which represents each phase of the multi-phase for the motor;
 wherein each of the H-bridge unipolar inverters further comprises two output ends adapted to electrically connect with said two ends of a respective one of the plurality of phase coil windings, such that the plurality of phase coil windings are arranged to operate independently without a common connection point;
 wherein each phase winding circuit comprises a current sensor for sensing value or amplitude of a phase current flowing through the phase coil winding, and an analog-to-digital converter for converting the value or amplitude of the sensed phase current value into a digital current data; and
 wherein the controller is configured to operate to process the digital current data of the plurality phase winding circuits to determine individual phase currents of the plurality of phase windings to determine angular position of the motor rotor.

17. The multi-phase brushless direct current motor according to claim 16, further comprising a digital controller, said digital controller including a plurality of output terminals;
 wherein one or more of the output terminals of the controller are arranged to electrically connect with respective control legs of each of the plurality of H-bridge unipolar inverters, with an output signal of the controller being pulse width-modulated sine waves, and said pulse width-modulated sine waves being adapted to drive respective ones of the plurality of H-bridge unipolar inverters;

wherein the pulse width-modulated sine waves are of identical frequency and amplitude;

wherein each respective one of said plurality of phase coil windings is independent one to another; with the pulse width-modulated sine waves corresponding to every two adjacent phase coil windings having a non-zero phase difference, and phase differences of the plurality of phase coil windings are identical.

18. The multi-phase brushless direct current motor according to claim 17, wherein said plurality of phase coil windings comprise at least one of: two phase coil windings, three phase coil windings, and phase coil windings in a number being a multiple of two or three.

19. The multi-phase brushless direct current motor according to claim 16, wherein the plurality of phase coil windings are arranged in parallel without a common connection point.

* * * * *